Oct. 9, 1951  F. B. FITCH  2,570,335
FLEXIBLE SHAFT
Filed March 25, 1949
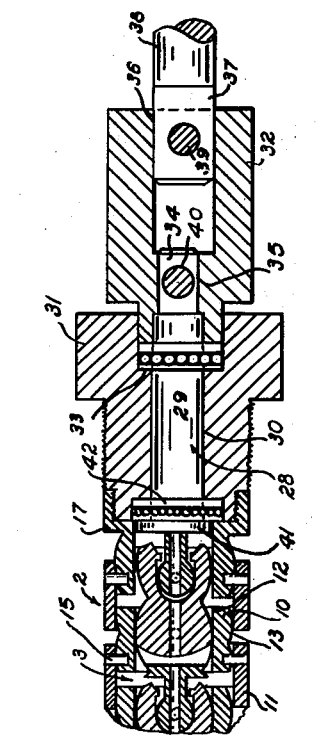
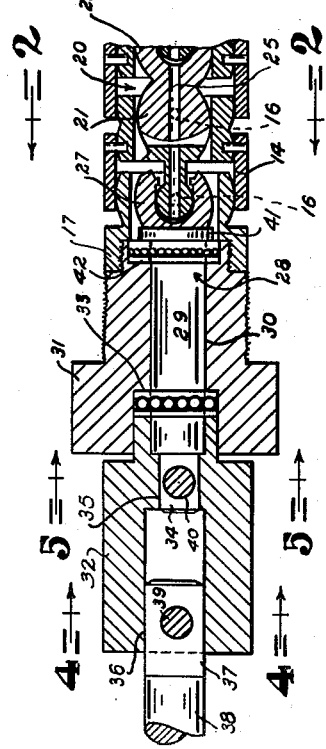
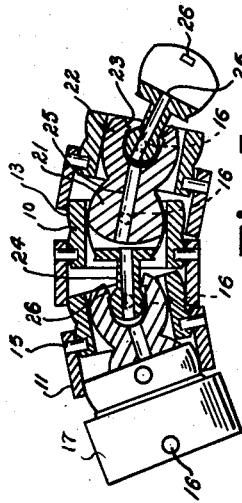
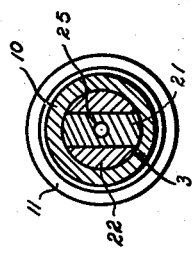
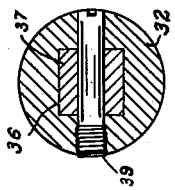
INVENTOR.
Frederick B. Fitch
BY Daniel H. Cullen
Attorney Patented Oct. 9, 1951

2,570,335

UNITED STATES PATENT OFFICE 2,570,335

FLEXIBLE SHAFT

Frederick B. Fitch, Detroit, Mich., assignor to Morris Farm Machinery Company, Detroit, Mich., a corporation of Michigan Application March 25, 1949, Serial No. 83,371

8 Claims. (Cl. 64—2)

This application relates to mechanical connections for coupling a driving shaft to a driven shaft for transmission of rotary motion and mechanically connecting the driving shaft to the driven shaft against relative separation from or movement towards each other, even though the axis of rotation is arranged to be shifted or curved laterally, typical of the lateral shifting that takes place in the class of devices known as flexible couplings.

In a prior application, Serial No. 68,797, filed January 3, 1949, now abandoned, I have shown a flexible coupling for coupling a driving shaft to a driven shaft. In such application, the flexible coupling is so constructed as to be slidably connected as a unit to the driving and driven shafts. The coupling includes an outer cover surrounding an intermediate assembly in the form of an articulated tube of connected rings and bushings in turn surrounding an inner assembly of connected links. Such inner assembly is there shown as including intermediate links of balls or trunnions and end links slidably connected with respect to the driving and driven shafts so as to be full floating lengthwise with respect to such shafts. The only mechanical connection between the driving and driven shafts and the inner assembly is a non-rotary connection accomplished by the use of a square member in a square hole, coupling the parts only for transmission of rotary forces. Thrust of the driving or driven shafts towards the coupling is absorbed, in the coupling of that application, by the articulated tube and is thus not transmitted thru the links of the inner assembly. Since the inner assembly is full floating longitudinally with respect to the driving and driven shafts, these shafts impart no separation forces to the end links of the inner assembly, tending to move one end of the inner assembly longitudinally away from the other end of that inner assembly.

In this application, I have disclosed a combination including a flexible coupling generally similar to that of the aforesaid application but differing therefrom not only in the provision of means for connecting the driving and driven shafts to the end links of the inner assembly in such a way that these shafts impart separation forces to the end links of the inner assembly, but also in the provision of means whereby such longitudinal separation forces on the end links of the inner assembly are not transmitted through the balls or trunnions which form the intermediate links of the inner assembly.

One embodiment of my invention is disclosed in the accompanying drawing and the same is described in the following specification.

In the drawing:

Fig. 1 is a longitudinal sectional view of one embodiment of the invention.

Fig. 2 is a transverse view taken along line 2—2 of Fig. 1.

Fig. 3 is a longitudinal view in section of a fragment of the device shown in maximum angular position.

Figs. 4 and 5 are transverse views as if on lines 4—4 and 5—5 of Fig. 1.

Figs. 1 to 5 show a coupling including an intermediate assembly 2 and an inner assembly 3. Normally, a flexible oil retaining tube of rubber is secured to the end members of the assembly 2, but the same is here not shown, for purposes of clarity.

The intermediate assembly 2 is essentially an articulated tube comprising bearing rings 10 and retainer rings 11. Rings 10 have internal bearing surfaces 12 within which the inner assembly 3 rotates. The outer surfaces of rings 10 are divided transaxially to provide spherical surfaces 13 which fit freely within the internal surfaces 14 of the rings 11. Transverse pins 15 and 16, diametrically opposed, connect rings 10 and 11 swivelly but restrain them from longitudinal separation, to form an articulated tube serving as a bearing surface for the inner assembly. Rings 17 of the articulated tube are internally threaded to couple to end rings 31. Thus, the tube includes parts 31—17—11—10—17—31.

The inner assembly includes a plurality of trunnions or intermediate links 20 of double sphere form, each including a male or blade portion 21 and a female or yoke portion 22 of spherical form. Links 20 rotate in rings 10 and have inner surfaces 23 freely receiving blades 21, the latter having knob-like ends 24.

Links 20 are hollow, having bores 25 for oil passage.

Yokes 22, on their inner surfaces 23, have lands or lugs 26 useful in assembly to prevent separation of the links.

Normally the links are so positioned that knobs 24 of blades 21 are slidably clear of the lands 26 and of the inner ends of the inner surfaces 23 of yokes 22 so as to prevent jamming of the links.

End links 28 are formed integrally with stub shafts 29 supported by bearings 30 of the end rings 31 of the articulated tube.

Stub shafts 29 have squared end portions 34 fitted into square holes 35 of couplers 32 having square holes 36 receiving the squared ends 37 of drive and driven shafts 38. Transverse pins 39 and 40 connect end links 28 through couplers 32 to the drive and driven shafts 38 and prevent relative longitudinal separation of these parts.

Couplers 32 bear against thrust bearings 33 disposed in and against the end rings 31 of the articulated tube so that compressive end thrusts from the drive and driven shafts 38 are absorbed by the articulated tube rather than by the end links 28.

Longitudinal end pull or tension from one shaft 38 on an end link 28 is not transmitted to the other end link 28 through the trunnions 20 but rather is transmitted through one end ring 31 of the articulated tube and thus through the articulated tube, in turn being transmitted through such tube and its other end ring 31 to the other end link 28 of the inner assembly and thus to the other shaft 38. This is insured by the provision of a shoulder 41 on each end link 28 which engages a thrust bearing 42, similar to thrust bearing 33 and like it disposed in and against end member 31 of the articulated tube. In this way there is no tendency for separation of the trunnions 20 with respect to the end links 28. Thus, the driving and driven shafts, the end links, and the tube are all interlocked against relative longitudinal movement.

Now having described the flexible coupling means herein disclosed, reference should be had to the claims which follow.

I claim:

1. A flexible coupling for connecting driving and driven shafts comprising an inner or driving assembly composed of relatively longitudinally movable driving links interlocked against relative rotary motion, and an articulated tube of constant length surrounding and journalling the driving assembly and composed of solidly circular separate rings swivelly interconnected for angular shifting but without relative longitudinal or rotary movement, the tube terminating at its ends short of the ends of the end links whereby such end links can be connected outside the tube to the shafts, and cooperating formations on the end links and end rings interlocking them against relative longitudinal movement in either direction while permitting their relative rotary motion.

2. A flexible coupling for connecting driving and driven shafts comprising an inner or driving assembly composed of relatively longitudinally movable driving links interlocked against relative rotary motion, and an articulated tube of constant length surrounding and journalling the driving assembly and composed of solidly circular separate rings swivelly interconnected for angular shifting but without relative longitudinal or rotary movement, the tube terminating at its ends short of the ends of the end links whereby such end links can be connected outside the tube to the shafts, and cooperating formations on the end links and end rings interlocking them against any relative longitudinal movement in either direction while permitting their relative rotary motion.

3. In a flexible coupling, a plurality of interconnected drive units forming an interior assembly and normally relatively longitudinally movable under endwise thrusts and interlocked against relative rotary motion, and an articulated tube of constant length surrounding and journalling said assembly and comprising a plurality of rings swivelly interconnected for angular shifting but without relative rotary or longitudinal movement, end ones of such rings journalling end ones of the drive units, with the end drive units being adapted to be non-rotatably coupled to driving and driven members, and end thrust bearing means interlocked with the tube and end links for enabling any end thrust of such members to be absorbed by the end rings of the journalling tube rather than by the end drive units, with a member, an end ring, and an end drive unit at each end of the assembly being interlocked against relative longitudinal motion, but with only the member and the adjacent end drive unit being interlocked against relative rotary motion, and with the end member and end drive unit being free to rotate together relative to the adjacent end ring.

4. A flexible coupling for connecting driving and driven members and transmitting rotary motion between them whether they be axially alined or not, said coupling comprising an inner driving assembly of end and intermediate longitudinally arranged drive units or links connected to be longitudinally movable slightly towards and away from one another but restrained against relative rotation whereby they all rotate in unison and transmit rotary motion applied to one end unit through the intermediate units to the other end unit, and an articulated tube of constant length journalling and surrounding the driving assembly and formed of a plurality of solidly circular or uncut longitudinally arranged rings connected swivelly so as to be laterally shiftable during the flexing of the coupling, the swivel connections of the rings being such as to permit flexing of the tube as a whole while inhibiting relative rotation and longitudinal movement of the rings, and insuring the tube remaining of constant length on its neutral axis whether straight or flexed, the tube and the intermediate units of the inner driving assembly being free of relative interconnection whereby the intermediate units of the driving assembly may slide longitudinally and rotate freely in said tube, means for rotatably mounting the tube with respect to the driving and driven members whereby rotary motion is not applied to or transmitted through the tube from such members, and means nonrotatably connecting the end units to the driving and driven members whereby such units and members rotate in unison, journalled in the tube, and constructed to prevent relative longitudinal movements of said members and end units, and cooperating abutments on the tube and on the driving and driven members interlocking these members and the tube against relative longitudinal movement.

5. A flexible coupling for connecting driving and driven members and transmitting rotary motion between them whether they be axially alined or not, said coupling comprising an inner driving assembly of end and intermediate longitudinally arranged drive units or links connected to be longitudinally movable slightly towards and away from one another but restrained against relative rotation whereby they all rotate in unison and transmit rotary motion applied to one end unit through the intermediate units to the other end unit, and an articulated tube of constant length journalling and surrounding the driving assembly and formed of a plurality of solidly circular or uncut longitudinally arranged rings connected swivelly so as to be laterally shiftable during the flexing of the coupling, the swivel connections of the rings being such as to permit flexing of the tube as a whole while inhibiting relative rotation and longitudinal movement of the rings, and insuring the tube remaining of constant length on its neutral axis whether straight or flexed, the tube and the intermediate units of the inner driving assembly being free of relative interconnection whereby the intermediate units of the driving assembly may slide longitudinally and rotate freely in said tube, means for rotatably mounting the tube with respect to the driving and driven members whereby rotary motion is not applied to or transmitted through the tube from such members, and means nonrotatably connecting the end units to the driving and driven members whereby such units and members rotate in unison, journalled in the tube, and constructed to prevent relative longitudinal movements of said members and end units, and cooperating abutments on the tubes and on the driving and driven members interlocking these members and the tube against relative longitudinal movement in either direction.

6. A flexible coupling for connecting driving and driven members and transmitting rotary motion between them whether they be axially alined or not, said coupling comprising an inner driving assembly of end and intermediate longitudinally arranged drive units or links connected to be longitudinally movable slightly towards and away from one another but restrained against relative rotation whereby they all rotate in unison and transmit rotary motion applied to one end unit through the intermediate units to the other end unit, and an articulated tube of constant length journalling and surrounding the driving assembly and formed of a plurality of solidly circular or uncut longitudinally arranged rings connected swively so as to be laterally shiftable during the flexing of the coupling, the swivel connections of the rings being such as to permit flexing of the tube as a whole while inhibiting relative rotation and longitudinal movement of the rings, and insuring the tube remaining of constant length on its neutral axis whether straight or flexed, the tube and the intermediate units of the inner driving assembly being free of relative interconnection whereby the intermediate units of the driving assembly may slide longitudinally and rotate freely in said tube, means for rotatably mounting the tube with respect to the driving and driven members whereby rotary motion is not applied to or transmitted through the tube from such members, and means nonrotatably connecting the end units to the driving and driven members whereby such units and members rotate in unison, journalled in the tube, and constructed to prevent relative longitudinal movements of said members and end units, and cooperating abutments on the tube and on the driving and driven members interlocking these members and the tube against any relative longitudinal movement in either direction.

7. A flexible coupling for connecting rotary members, including a drive means comprising angularly shiftable drive units interlocked against relative rotation, and being arranged for relative longitudinal movement, means interlocking the members and the drive means as a whole against relative rotation and longitudinal movement, an articulated tube of constant length connecting the members and surrounding and journalling the drive means and comprising swively connected solidly circular uncut rings whose swivel connections permit relative angular shifting of the rings and articulation or flexing of the tube and prevent their relative longitudinal or rotary motion, and interlocking means connecting the ends of the tube and the members to permit relative rotation of the members and tube and interlocking the members and tube against relative longitudinal movement.

8. A flexible coupling for connecting rotary members, including a drive means comprising angularly shiftable drive units interlocked against relative rotation, and being arranged for relative longitudinal movement, means interlocking the members and the drive means as a whole against relative rotation and longitudinal movement, an articulated tube of constant length connecting the members and surrounding and journalling the drive means and comprising swively connected solidly circular uncut rings whose swivel connections permit relative angular shifting of the rings and articulation or flexing of the tube and prevent their relative longitudinal or rotary motion, and interlocking means connecting the ends of the tube and the members to permit relative rotation of the members and tube and interlocking the members and tube against relative longitudial movement in either direction.

FREDERICK B. FITCH.

REFERENCES CITED

The following references are of record in the file of this patent:

UNITED STATES PATENTS

| Number | Name | Date |
| --- | --- | --- |
| Re. 7,960 | Starr | Mar. 20, 1877 |
| 670,748 | Weddeler | Mar. 26, 1901 |
| 2,090,174 | Albright | Aug. 17, 1937 |